United States Patent [19]

Wivagg et al.

[11] Patent Number: 5,065,490
[45] Date of Patent: Nov. 19, 1991

[54] THREADED INSERT FOR REPAIRING A NUCLEAR ASSEMBLY

[75] Inventors: Adrian P. Wivagg, Tolland; Kenneth A. Martin, Windsor, both of Conn.

[73] Assignee: Combustion Engineering, Inc., Windsor, Conn.

[21] Appl. No.: 531,219

[22] Filed: May 31, 1990

[51] Int. Cl.$^5$ .................................. B23P 6/00
[52] U.S. Cl. ........................ 29/402.17; 29/402.01; 29/402.14; 29/402.09; 29/525.1; 411/60; 411/182; 24/297
[58] Field of Search ............... 29/525, 525.1, 402.01, 29/402.03, 402.08, 402.09, 402.14, 402.17, 433, 723; 403/408.1; 24/297, 453; 411/182, 40, 41, 45, 46, 48, 55, 60

[56] References Cited

U.S. PATENT DOCUMENTS

| | | | |
|---|---|---|---|
| 2,649,884 | 9/1953 | Westover | 411/182 |
| 3,313,083 | 4/1967 | Flora | 24/297 |
| 4,263,833 | 4/1981 | Loudin et al. | 411/60 |
| 4,478,545 | 10/1984 | Mizusawa et al. | 411/182 |

Primary Examiner—P. W. Echols
Assistant Examiner—David P. Bryant
Attorney, Agent, or Firm—John H. Mulholland

[57] ABSTRACT

A bolt insert 24 with special bolt 50 provides a fastening method to secure hard metal nuclear reactor parts 12, 14, 16 provided with aligned square EDM produced openings 18, 20, 22. The insert is an elongated square internally threaded member with slots 34 defining flexing fingers 36. Fingers 36 have work engaging shoulders 42. Stop means tabs 28 at the bolt head end prevent overinsertion of the square insert 24 during the operation of pushing it into aligned square holes 18, 20, 22. Internal threads 32 of insert 24 mate with bolt threads 60 during torquing on bolt head 52 to advance bolt 50, which has tapered end 56 and pilot portion 58, to cam fingers 36 into holding position. Counterbores 30 receive stop means tabs 28 such that bolt head 52 does not bottom on insert 24. The method of producing fastening 10 removes the need for accurate threading operations on irradiated parts in the remote field.

3 Claims, 1 Drawing Sheet

THREADED INSERT FOR REPAIRING A NUCLEAR ASSEMBLY

FIELD OF THE INVENTION

This invention relates to the repair of hard metal assemblies of boiling or pressurized water-cooled nuclear power facilities. It is an alternative method of repair to that disclosed in an application entitled Method of Repairing A Nuclear Assembly filed by Adrian Peter Wivagg, May 1990 (C89052O).

BACKGROUND OF THE INVENTION

The repair of hard metal assemblies of boiling or pressurized water-cooled nuclear power facilities must comply with the requirements of 10 CFR 50.55a which includes by reference the American Society of Mechanical Engineers (ASME) Boiler and Pressure Vessel Code.

Nuclear reactors and other components of nuclear power facilities are made of hard metal, i.e., steel and other relatively hard alloys and therefore present fastening problems that soft materials such as wood, plastics, sheet metal or aluminum do not. The technicians servicing nuclear power facilities are normally operating in the "field" away from their normal machine shops and other work facilities and typically must accomplish the necessary repairs in the irradiated environment of a nuclear reactor or associated steam system. An example of such repairs would be a reactor shield support repair involving replacement of a support block bolt.

The problem of making hard metal component assemblies using fasteners which "meet code" can be better understood with reference to the above mentioned ASME code and supporting requirements. It will be readily apparent that to machine threads, fastener insert cavities or counterbores in nuclear sub-assemblies or components in the field can be a problem, particularly if irradiated parts of a nuclear reactor are involved.

SUMMARY OF THE INVENTION

The present invention is a method of repair of hard metal component assemblies of boiling or pressurized water-cooled nuclear power facilities. It involves the steps of providing aligned openings in a plurality of hard metal parts to be assembled and the fastening of the parts together.

A non-cylindrically shaped hole is made to define each of the aligned openings in order to eliminate the previous bolt holes which might have damaged threads, for example. In order to do this operation, an electron discharge machining (EDM) head with a chisel shaped tool makes passes in the parts of hard metal which are parts of the assembly.

After the plurality of aligned non-cylindrical openings are thus provided in the hard metal parts, an elongated hollow threaded bolt insert, with at least a portion thereof of a cross-section complimentarily shaped to that of the openings, is pushed into place therein. The insert has stop means in the form of transversely outwardly extending tabs an its rearward end. The tabs fit in spaced EDM machined pockets analogous to counterbore portions of the aligned non-cylindrical openings. If the non-circular shape is square, there are typically two or four spaced stop means tabs and openings therefor provided. The stop means engage the rearmost part (relative to the pushing direction) to limit travel of the insert in the pushing direction. In addition to the stop means the insert includes a shank and work retaining tabs. The shank includes internal threads adjacent the stop means and longitudinal slots which define flexing fingers, which include at their ends remote from the threads and stop means, the work retaining tabs. The tabs have an outer surface contour which flexes fingers inwardly during the pushing operation and work engaging shoulders for engagement with the forwardmost part (relative to the pushing direction) most remote from the stop means in the exposed marginal area surrounding the aligned opening of that remote part when the stop means are seated. The insert is pushed to the limit of its motion with the tabs clear of the aligned openings and with the fingers flexed outwardly.

A bolt is provided for use in the insert which has a torquing head, a shank with a leading end, an adjacent pilot portion and a threaded portion between the pilot portion and the torquing head. The bolt is inserted into the hollow threaded bolt insert through the insert end adjacent the stop means. The leading bolt end, which is tapered, and pilot portion are inserted first to move and hold the flexing fingers in position with the work retaining tabs' work engaging shoulders in engagement with the hard metal part remote from the stop means. The bolt is torqued in the insert threads to fasten the hard metal parts together. In this regard, it is to be noted that the distance from the shoulders to the stop means is less than the combined length of the aligned openings of the metal parts. Accordingly, in performing the step of torquing the bolt in the insert threads to fasten the hard metal parts together, the bolt head does not advance into contact with the insert. As the bolt advances in the threads the tapered leading bolt end preferably performs an outward camming of the flexing fingers and the pilot portion is a smooth continuation of the taper to maintain the outwardly cammed position of the fingers upon completion of the torquing step.

A "Class A" locking collar such as disclosed in the above referenced copending application, for example, can be used in connection with the bolt head for crimping to interfere with undesired bolt rotation of an installed bolt.

DETAILED DESCRIPTION OF THE PREFERRED EMBODIMENT

Figure 1:
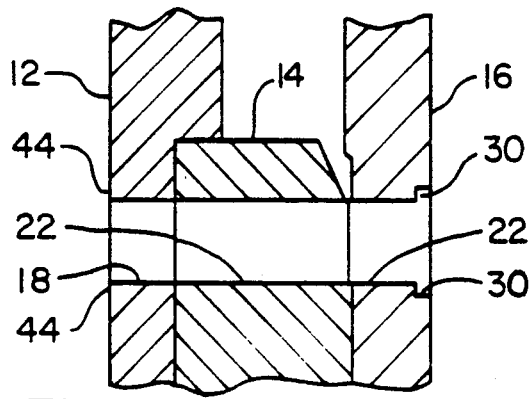
FIG. 1 is a fragmentary cross-sectional elevational view of three hard metal parts of a nuclear reactor to be fastened, namely, a core barrel, a support block and a thermal shield with aligned openings of square cross-section.
Figure 2:
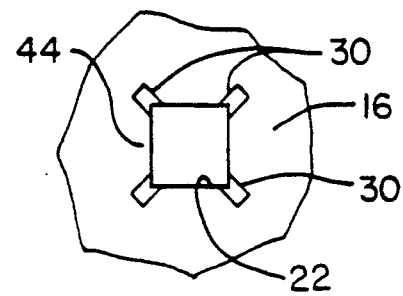
FIG. 2 is an end elevational view of the structure shown in FIG. 1.

The method of the invention defines a procedural combination of steps to effect a repair of hard metal component assemblies of boiling or pressurized water-cooled nuclear power facilities. Typically, these parts are steel reactor parts and in the illustrated fastened assembly, generally designated by the numeral 10. The parts are a nuclear reactor core barrel 12, a support block 14 and a thermal shield 16.

In a reactor, these parts are usually fastened by bolts in aligned bores of the parts, at least one of which, the core barrel, for example, is threaded. Either because of irradiation, drifting of reactor parts during use or disassembly for repair purposes, the threads or original aligned fastener holes may become damaged. Accurate re-threading in remote field locations is difficult.

By a step of electron discharge machining (EDM) square holes or openings 18, 20, 22 are provided in aligned parts 12, 14 and 16, respectively. Although the EDM square holes are not made to close tolerances, they are noncircular and provide for securement against rotation during torquing of an elongated hollow threaded bolt insert 24, preferrably of steel, having a shank portion 26 of square cross-section complementarily shaped to that of the square openings 18, 20, 22.

Figure 3:
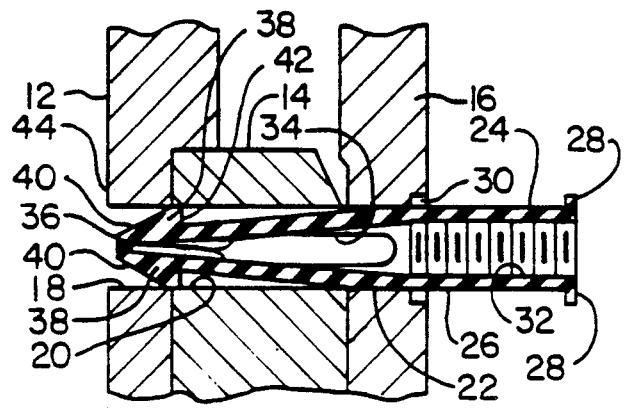
FIG. 3 is a view similar to FIG. 1 with the elongated hollow threaded bolt insert pushed part way into the aligned openings of the hard metal parts to be assembled.
Figure 4:
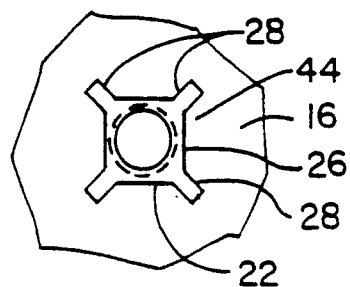
FIG. 4 is an end elevational view of the structure shown in FIG. 3.

As shown in FIGS. 3 and 4, the insert 24 has a stop means in the form of tabs 28 which extend transversely outward of its rearmost end relative the direction it is pushed into the aligned openings 18, 20, 22. The tabs 28 fit in spaced EDM machined pockets 30 of part 16 analogous to counterbore portions of the square opening 22 in thermal shield 16 to limit travel of the insert 24 in the pushing direction.

The insert shank 26 includes internal threads 32 adjacent tabs 28 and longitudinal slots 34 which define flexing fingers 36. The ends of flexing fingers 36 remote from tabs 28 include work retaining tabs 38. The work retaining tabs 38 include an outer surface portion 40 which act as cam means during the pushing operation, as illustrated in FIG. 3, to flex fingers 36 inwardly.

When the work retaining tabs 38 clear the hard metal part which is core barrel 12, remote from the stop means 28, and expand outwardly to engage shoulders 42 thereof against the exposed marginal area 44 surrounding the aligned opening 18 of the barrel 12, the insert 24 is in position with stop means tabs 28 in the "countersunk" portions 30.

The stop means tabs 28 on insert 24 are positioned such that the distance from the shoulders 42 to the stop means tabs 28 is less than the combined length of the aligned openings 18, 20, 22 of the parts 12, 14, 16. Accordingly, the bolt will not "bottom" on the insert 24.

Figure 5:
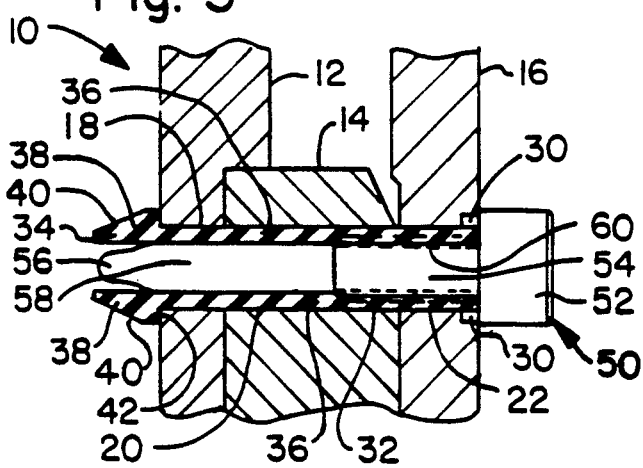
FIG. 5 is a view similar to FIGS. 1 and 3 after the fastening method has been completed with the hollow threaded bolt insert and bolt in final assembled position.
Figure 6:
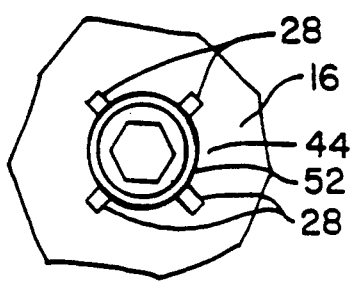
FIG. 6 is an end elevational view of the structure shown in FIG. 5.

The special bolt 50, preferably of steel, provided for torquing in the installed insert 24, as shown in FIG. 5, has a torquing head 52, a shank 54 with a leading end 56, an adjacent pilot portion 58 and a threaded portion 60 between the pilot portion 58 and torquing head 52 for mating with threads 32 on insert 24. The bolt 50 is inserted into the hollow threaded bolt insert 24 through the insert end adjacent stop means 28 and within the thermal shield 16.

The tapered leading end 56 of bolt 50 is inserted into the hollow threaded bolt insert 24 through the insert end adjacent stop means tabs 28. The tapered end 56 and pilot portion 58 are inserted first to move and hold the flexing fingers 36 in position with the work retaining tabs' 38 work engaging shoulders 42 in engagement with the core barrel 12.

The bolt 50 is torqued in the insert threads 32 to fasten the core barrel 12, support block 14 and thermal shield 16 together. As the mating bolt threads 60 advance in the threads 32 of the insert 24, the tapered leading bolt end 56 preferably performs an outward camming of the flexing fingers 36 and the pilot portion 58 maintains the outwardly cammed position of fingers 36 with shoulders 42 against the core barrel 12, completing the repair fastening.

We claim:

1. A method of repairing a nuclear power facility metal component assembly with a fastening between hard metal parts comprising the steps of:

providing aligned non-cylindrically shaped openings in a plurality of hard metal parts to be assembled;

pushing into said openings an elongated hollow threaded bolt insert having a portion of cross-section complementarily shaped to that of the openings, said insert having a stop means, a shank and work retaining tabs;

said stop means including work engaging means to limit travel of the insert in the pushing direction;

said shank of said insert including internal insert threads adjacent said stop means and longitudinal slots defining flexing fingers which include said work retaining tabs on the ends thereof remote from said stop means;

said work retaining tabs including cam means on the outer surface portions thereof to flex said fingers inwardly during pushing and work engaging shoulders for engagement with the hard metal part remote from the stop means in the exposed marginal area surrounding the aligned opening of that remote part when said fingers are flexed outwardly with said tabs clear of the aligned openings;

providing a bolt with a torquing head, a shank with a leading end and adjacent pilot portion and a threaded portion between the pilot portion and the torquing head;

inserting said bolt into said hollow threaded bolt insert through the insert end adjacent said stop means, leading bolt end and pilot portion first, thereby to move and hold said flexing fingers in position with said work retaining tabs' work engaging shoulders in engagement with the hard metal part remote from the stop means;

torquing said bolt in said insert threads to fasten said hard metal parts together;

said shoulders being a distance from the stop means less than the combined length of the aligned openings of the metal parts such that in performing the step of torquing said bolt in said insert threads to fasten said hard metal parts together, the bolt head does not advance into contact with said insert.

2. The method of claim 1 in which the stop means are tabs on the insert transversely outward of its end adjacent the bolt head and countersunk adjacent the aligned openings such that the bolt head torquing does not advance the bolt head into contact with said insert.

3. The method of claim 1 in which the leading bolt end is tapered and performs an outward camming of the flexing fingers during the torquing step and the pilot portion is a smooth continuation of the taper to maintain the outwardly cammed position of the fingers upon completion of the torquing step.

* * * * *